July 6, 1965      R. J. ESSLING      3,193,124
EXTENDABLE AUTO RACK FOR BOAT
Filed March 4, 1963      2 Sheets-Sheet 1
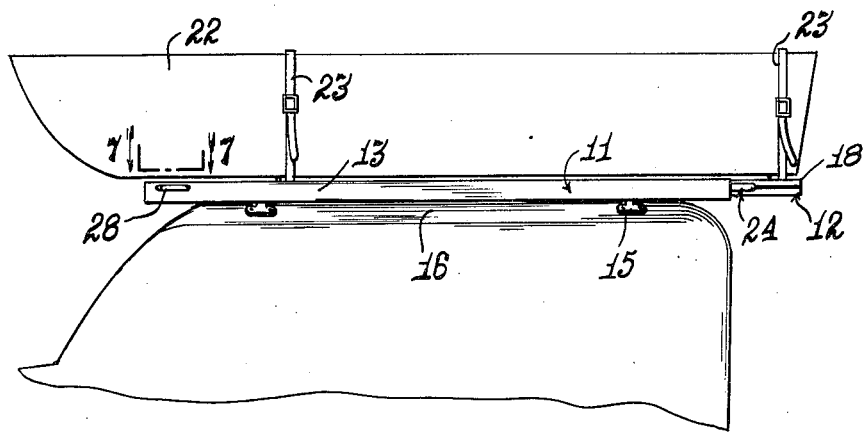
Fig. 1
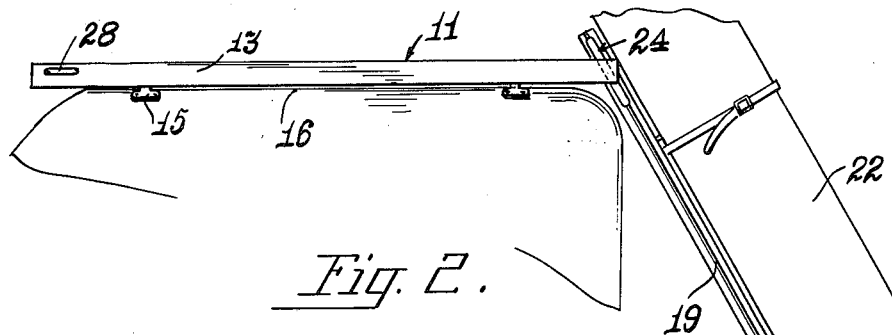
Fig. 2
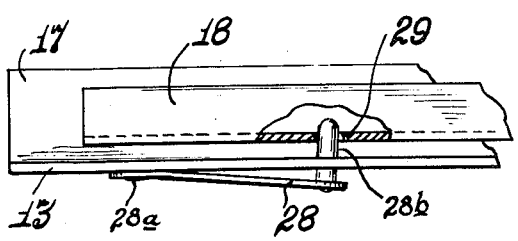
Fig. 7
INVENTOR.
Raymond J. Essling.
BY Charles H. Redman
Attorney.

July 6, 1965 R. J. ESSLING 3,193,124
EXTENDABLE AUTO RACK FOR BOAT
Filed March 4, 1963 2 Sheets-Sheet 2

INVENTOR.
Raymond J. Essling
BY Charles H. Redman
Attorney.

United States Patent Office 3,193,124
Patented July 6, 1965

3,193,124
EXTENDABLE AUTO RACK FOR BOAT
Raymond J. Essling, 103 S. River St., Batavia, Ill.
Filed Mar. 4, 1963, Ser. No. 262,593
2 Claims. (Cl. 214—450)

The present invention relates to improvements in load transporting apparatus and particularly to novel apparatus for carrying an article, such as a boat, upon the roof of an automobile or like vehicle.

Various types of apparatus have been provided for this general purpose but each is objectionable for various reasons and primarily because in many such apparatus the structure is extremely complex and the load carrying frame is incapable of separation from its associated mounting frame. In such instances where frame separation is possible, considerable difficulty arises from seeking to position the load carrying frame on the mounting frame and in easily securing it firmly to prevent its displacement.

It is, therefore, an object of the invention to provide a novelly constructed load transporting apparatus.

Another object is to provide an apparatus of the character described which requires minimum effort while loading.

Another object is to provide, in an apparatus of the character referred to, novel, easily assembled slide-hinge connections between the carrying frame and the mounting frame.

The structure by means of which the above noted and other advantages and objects of the invention are attained will be described in the following specification, taken in conjunction with the accompanying drawings, showing a preferred embodiment of the invention, in which:

FIG. 1 is a fragmentary side elevational view of a vehicle showing the novel load transporting apparatus loaded and in place thereon;

FIG. 2 is a view similar to FIG. 1, showing the load carrying frame in loading position;

FIG. 3 is a plan view of the apparatus, showing parts broken away;

FIG. 4 is an enlarged fragmentary plan view of a portion of the load carrying and mounting frames;

FIG. 5 is a detailed sectional view taken substantially on line 5—5 of FIG. 4;

FIG. 6 is an enlarged detail sectional view taken on line 6—6 of FIG. 4; and,

FIG. 7 is an enlarged detail fragmentary plan view of the forward end of the assembly, as viewed along line 7—7 of FIG. 1.

Referring to the exemplary disclosure of the invention in the accompanying drawings, the load transporting apparatus includes a mounting frame 11 and a load carrying frame 12. The mounting frame comprises (FIG. 3) a pair of parallel angle bars 13, 13 suitably connected by spaced cross braces 14, 14 that each terminate at their ends in flared portions 15 defining feet adapted to rest upon and be bolted or otherwise secured to the roof 16 of a vehicle. The horizontal bottom flanges 17 of angle bars 13 are disposed inwardly towards each other for a purpose to be explained presently.

The load carrying frame 12 is comprised of a pair of tubular side rails 18 longitudinally slotted on their outside faces, as at 19, and joined by cross ties 21 which constitute a support surface for the load, such as the boat 22 illustrated. The tubular side rails 18 are square or rectangular in section and they constitute longitudinal tracks. When the boat is placed on the load carrying frame, it is secured thereto as by means of fastening devices, such as straps 23.

The load carrying frame 12 is slidably, pivotally mounted on the mounting frame 11 by means of pivotally mounted roller carrying assemblies 24. As best shown in FIGS. 4, 5 and 6, these assemblies each comprise a bar 25 pivoted between its ends, as at 26, to the upstanding flange of the related mounting frame angle bar 13 adjacent one end, in this instance the end at the rearmost end of the vehicle. The bar 25 carries on each end a roller 27 that is engaged in the tubular side rail or track 18 of the load carrying frame 12, the slot 19 in said rail admitting the wheel axle freely therethrough. During loading, the load carrying frame 12 is moved rearwardly of the vehicle and is allowed to assume the inclined or "ramp" position shown in FIG. 2. The load is secured thereto and said frame then is lifted upwardly and pushed forwardly along the mounting frame into the horizontal position shown in FIG. 1. Such pivoting and sliding is facilitated by the pivotal mounting of the roller carrying assemblies 24 and the presence of rollers 27 which minimize friction during sliding. When in the FIG. 1 position, the front end of the load carrying frame rests upon the bottom flanges 17 of the mounting frame and a spring latch 28 (FIG. 7) carried by at least one of the angle bars 13 engages an aperture 29 in the wall of a related one of the side rails 18. The spring latch is pivoted as at 28a to the angle bar whereby the latch may be rotated, when not in use, to place the latch member 28b in an out-of-the-way position.

The load carrying frame can be removed from the mounting frame 12 by sliding it longitudinally out of engagement with the roller assemblies 24. Adjustment of the relative positions of the cross braces 14 and cross ties 21 may be effected by providing a series of holes 31, 32 respectively, therein to selectively receive the connecting bolts. This adapts the structure for adjustment to vehicle and load size.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What I claim and desire to secure by Letters Patent of the United States is:

1. A load supporting apparatus comprising a first frame adapted to be secured to the roof of a vehicle, said first frame including parallel side rails having horizontal and vertical flanges, a bracket pivotally connected to each vertical flange adjacent to one end of the first frame, rollers on said brackets, a second frame, said second frame including spaced parallel side members each tubular in section to receive the rollers therein, said second frame being movable from an inclined position at one end of the first frame into a position lying flat upon the first frame, said second frame having the ends of its side members rested upon the horizontal flanges when in such flat position, and means on the second frame for securing a load thereto.

2. A load supporting apparatus comprising a first frame adapted to be secured to the roof of a vehicle, said first frame including parallel side rails having horizontal and vertical flanges, a bracket pivotally connected to each vertical flange adjacent to one end of the first frame, rollers on said brackets, a second frame, said second frame including spaced parallel side members each having a track substantially coextensive therewith to receive the rollers therein, said second frame being movable from an inclined position at one end of the first frame into a position lying flat upon the first frame, said second frame having the ends of its side members rested upon the horizontal flanges when in such flat position, and means on the second frame for securing a load thereto.

References Cited by the Examiner

UNITED STATES PATENTS

| | | |
|---|---|---|
| 2,284,419 | 5/42 | Greig. |
| 2,547,083 | 4/51 | Lundgren _____ 214—451 |
| 2,808,952 | 10/57 | Nicholas _____ 214—450 |
| 3,058,636 | 10/62 | Bilbeisi _____ 214—450 X |

HUGO O. SCHULZ, *Primary Examiner.*